UNITED STATES PATENT OFFICE.

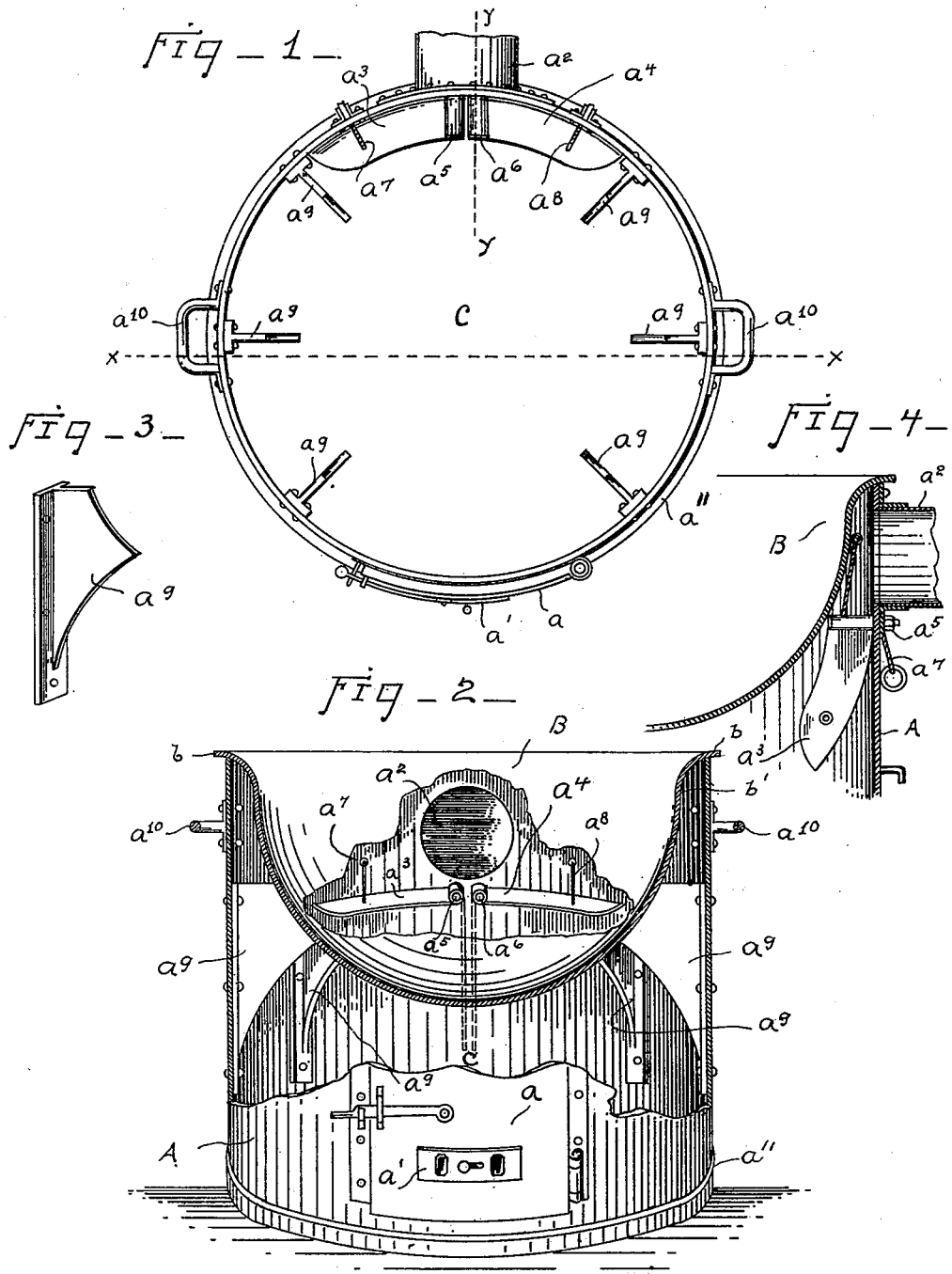

WILLIAM S. WRIGHT, OF TOLEDO, OHIO.

PORTABLE FEED-COOKER.

SPECIFICATION forming part of Letters Patent No. 623,755, dated April 25, 1899.

Application filed October 31, 1898. Serial No. 695,018. (No model.)

*To all whom it may concern:*

Be it known that I, WILLIAM S. WRIGHT, a citizen of the United States, residing at Toledo, in the county of Lucas and State of Ohio, have invented a new and useful Improvement in Portable Feed-Cookers, of which the following is a specification.

My invention relates to portable feed-cookers for cooking feed for cattle, heating water, and other similar purposes, and has for its objects to combine lightness and strength with means to evenly distribute the heat around the heating vessel, to economize fuel, and regulate and control its combustion.

With these objects in view my invention consists of a portable feed-cooker of the kind described, comprising a sheet-metal cylinder open at both ends, provided with handles for lifting and carrying it and with a door and flue, having one of its ends adapted to serve as a base when resting on the ground and the other to receive and support the heating vessel, a heating vessel having an outwardly-flanged rim of dimensions adapted to allow the vessel to enter the top end of the cylinder and be supported therein by its flanged rim resting thereon and to form with it a closed combustion-chamber for heating the vessel, having an air-space extending around the vessel to its rim, and hinged dampers within the combustion-chamber, adapted to be so arranged with reference to the vessel, the cylinder, the flue, and to each other as to either admit or cut off direct draft to the flue; furthermore, of a cylinder and vessel of the kind described, adapted to form together a closed combustion-chamber having a door provided with a draft-door and a flue placed oppositely to the door, hinged dampers adapted to admit or cut off direct draft from the door to the flue, and vertical ribs attached to the cylinder on the inner side, having inwardly-projecting vertical flanges or diaphragms adapted at their inner edges to engage and conform to the contour of the vessel, divide the middle portion of the combustion-chamber surrounding it, and direct the heated air and products of combustion upward and around the upper part of the vessel to the flue.

In the accompanying drawings, forming a part of this specification, in which like letters of reference indicate corresponding parts, Figure 1 is a top view of the cylinder with the vessel removed, showing the position of the hinged dampers when arranged to cut off direct draft to the flue and of the flanged ribs. Fig. 2, as to the upper part, is a vertical section through line X X of Fig. 1 with the vessel in position and broken through to show position of hinged dampers (when arranged to cut off draft) relative to the flue and showing the form, position, and means of attachment of the flanged ribs. The lower part shows the base of the cylinder in perspective, with the upper portion broken away. Fig. 3 is a view of one of the flanged ribs detached from the cylinder; and Fig. 4 is a vertical section through line Y Y of Fig. 1, showing a side view of one of the hinged dampers when open and in a pendent position relative to the flue and to its attachment.

In the drawings, A is the cylinder, having the door $a$, which may be provided with any suitable draft-door $a'$, flue $a^2$, dampers $a^3$ and $a^4$, hinged at one end to supporting-bolts $a^5$ and $a^6$, attached to the cylinder, and provided at their free ends with wire cords or chains $a^7$ and $a^8$ to raise their free ends from a pendent perpendicular position, which they assume by gravity when released to a horizontal position, as shown in Figs. 1 and 2, and hold them in such position, flanged ribs $a^9$, handles $a^{10}$, and base-ring $a^{11}$.

B is a metallic heating vessel having flanged rim $b$, of equal or greater circumference than the top of the cylinder, and body $b'$, of lesser circumference, adapted to enter the cylinder and leave a surrounding air-space, and C is the combustion-chamber, formed when the cylinder is standing on its base and vessel B is in position therein and supported thereby by its rim $b$. When the heating vessel is in such position, its outer surface also touches the inner edges of the flanges or diaphragms of ribs $a^9$, whereby the middle portion of the combustion-chamber C is divided and short flues are formed between the upper and lower portions thereof, whereby when hinged dampers $a^3$ and $a^4$ are in the position shown in Figs. 1 and 2, the heated air and products of combustion are directed upward to the upper part of the combustion-chamber in contact with all parts of the vessel before they can find their way to the flue, and thus cause the heat to be more evenly distributed around the vessel. When starting a fire, by lowering the free ends of hinged dampers $a^3$ and $a^4$ by chains $a^7$ and $a^8$, which pass through small openings in the cylinder to the outside where they are convenient of access and are provided with any suitable fastening by which they may be made to hold the dampers in a horizontal position, the dampers assume a perpendicular position, (indicated by dotted lines on Fig. 2,) and an opening is made for a direct draft from door $a$ or draft-door $a'$ to the flue $a^2$. After combustion has been sufficiently developed by raising hinged dampers $a^3$ and $a^4$ by chains $a^7$ and $a^8$ to a horizontal position they close the part of the space between the vessel and the cylinder directly beneath flue $a^2$, whereby direct draft from the door to the flue is cut off, and the heated air and products of combustion are forced upward around the vessel between the flanges of the ribs $a^9$, as aforesaid, and produce the result aforesaid.

It is apparent that in the absence of the flanged ribs dampers $a^3$ and $a^4$ would in some degree produce a similar result and would effect a partial distribution of the heat around the vessel, and I therefore do not desire to be limited to the use of such ribs, although such use is preferable.

Having thus fully described my invention, what I claim to be new, and desire to secure by Letters Patent, is—

1. In a portable feed-cooker, a pair of dampers within the combustion-chamber, disconnected from any other permanent or movable draft device, each pivoted at one end to the wall of the chamber beneath the flue, with the other end free, and adapted, when the free ends are held in the same horizontal plane, to bridge a portion of the air-space between the heating vessel and the wall of the chamber, and cause indirect draft around the heating vessel to the flue, and when released, to assume by gravity a vertical pendent position, and leave the natural drafts free and unobstructed, substantially as shown and for the purpose described.

2. In a portable feed-cooker, a heating vessel provided with a supporting-flange, and a sheet-metal cylinder, having a door, a flue, and open ends, with one end adapted to serve as a base when standing vertical on the ground, and the other, to receive and support the vessel within the cylinder by its flange, and adapted to form with the vessel, when so placed, with the cylinder standing on the ground upon its base, a combustion-chamber around the vessel, in combination with flanged ribs $a^9$, adapted to be attached vertically to the cylinder and divide the middle portion of the combustion-chamber, and hinged dampers $a^3$ and $a^4$, within the chamber, constructed, placed, and operating substantially as shown and for the purpose described.

3. In a portable feed-cooker, a plurality of ribs $a^9$, adapted to be attached vertically at intervals to the wall of the combustion-chamber, and having flanges or diaphragms extending to the heating vessel, and adapted to divide vertically the middle air-space between the vessel and the wall of the chamber, and leave the upper and lower portions thereof open and free, when constructed, located and operating, substantially as shown and for the purpose described.

WILLIAM S. WRIGHT.

Witnesses:
WALLACE E. COLLER,
CLAUDE C. COLLER.